Jan. 21, 1958  R. L. LOWE  2,820,669
ANTI-GLARE SHIELDS AND ATTACHMENT MEANS THEREFOR
Filed Sept. 15, 1955
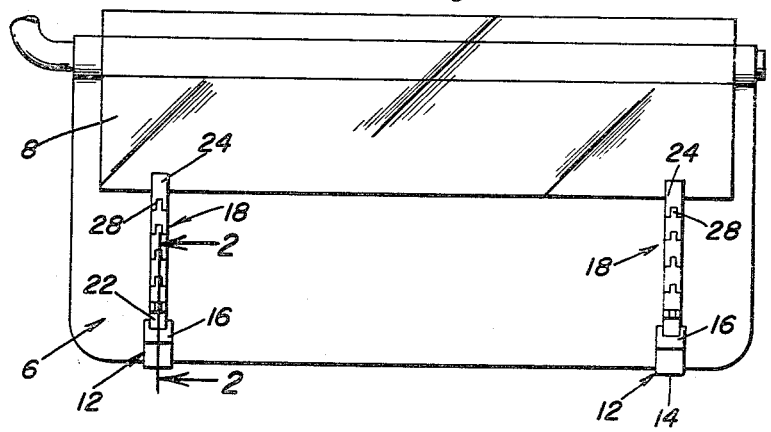
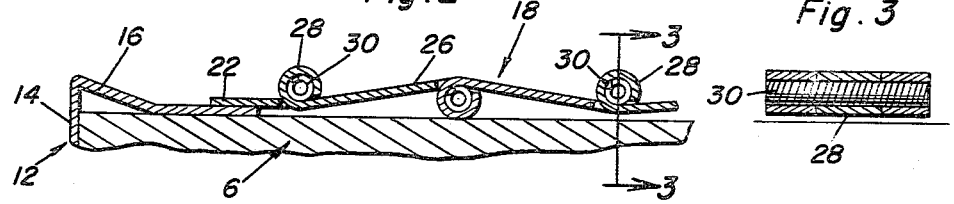
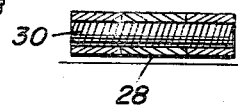
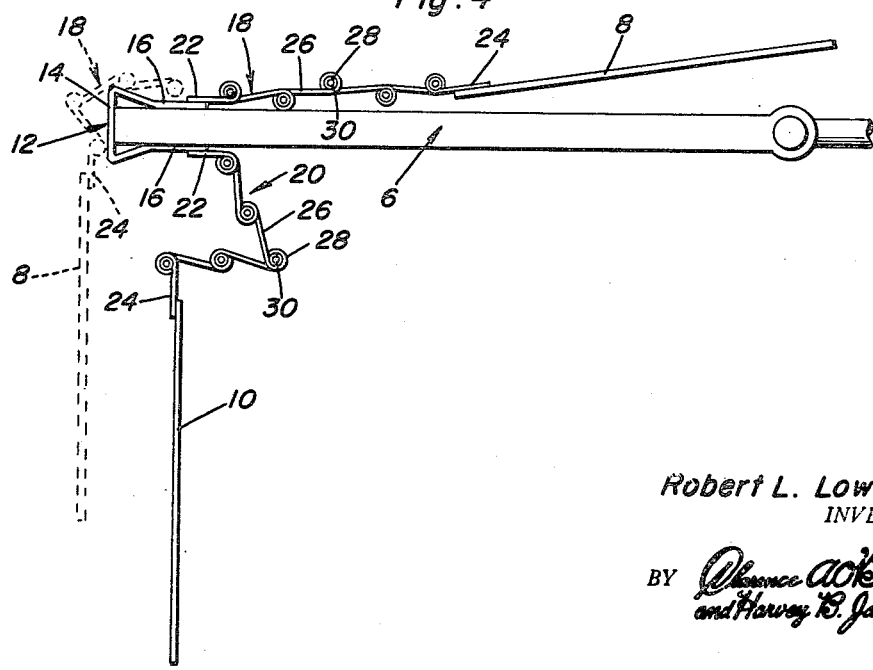
Robert L. Lowe
INVENTOR.

United States Patent Office 2,820,669
Patented Jan. 21, 1958

2,820,669

ANTI-GLARE SHIELDS AND ATTACHMENT MEANS THEREFOR

Robert L. Lowe, Detroit, Mich.

Application September 15, 1955, Serial No. 534,586

1 Claim. (Cl. 296—97)

The present invention relates to anti-glare shields, brackets for connection to an edge portion of the conventional vehicle sun visor, and novel supporting and operating connections between the brackets and anti-glare shields.

In order to understand the significance of the preceding general statement of the invention, it will be helpful to the reader to acquaint himself with the fact that the concept here has to do with an improvement on a similarly constructed and performing arrangement disclosed in copending Ser. No. 506,518 of May 6, 1955, now Patent No. 2,793,072, issued May 21, 1957. Briefly, the prior construction is characterized by at least one anti-glare shield of a prescribed degree of transparency. Using one or more attaching brackets an edge portion of the shield is attached to a longitudinal edge portion of the sun visor, using the sun visor as a satisfactory hanger or support for the shield. More particularly, each bracket is characterized by a U-shaped clip carrying a twin leaf hinge cooperating with a notch in an edge portion of the shield and providing bracketing and hinging means for the shield.

Along similar lines, the invention here involves a dual arrangement of anti-glare shields and hinging and bracketing means for supporting the same on a longitudinal edge portion of a sun visor. The so-called forward shield preferably has a ten percent transparency or visibility, while the rear shield has an approximate twenty-seven percent transparency so that the shields may be used singly or collectively. That is to say, the shield which has the smaller or ten percent visibility will be about right for driving in the sun, whereas when the sun is overly bright and offers a dazzling glare, both shields may then be brought collectively into play. By the same token, the one shield, the one with the twenty-seven percent visibility, will be ideal for ordinary night driving requirements where dazzling headlight beams must be contended with.

In the aforementioned copending Ser. No. 506,518, there are two brackets each including a U-shaped clip with suitable bends projecting laterally and supporting twin hinges, with the twin hinges, in turn, providing the operating connection between the brackets and anti-glare shields. It is sometimes desirable to leave the sun visor in a horizontal position rather than to swing it down vertically. This means that a more flexible hinge connection between the shields and visor is required. It is therefore an object of the present invention to provide elongate, extensible and retractable linkage connections between the U-shaped brackets and the anti-glare shields in order to enable a user to have a desirable range of adjustments in keeping with ever varying driving requirements.

Other objects, features and advantages will become more readily apparent from the following description and the accompanying drawings.

In the drawings:

Figure 1 is a top plan view, assuming that the sun shield is in a horizontal plane, and showing the anti-glare shield and means whereby the same is connected with the sun visor;

Figure 2 is an exaggerated detail section on the line 2—2 of Figure 1;

Figure 3 is a section on the line 3—3 of Figure 2; and

Figure 4 is an edge elevation wherein both anti-glare shields are shown and are shifted to different relative positions to show the versatility of the hinging means.

Referring now to the drawings, and especially to Figure 4, the numeral 6 designates a conventional sun visor of the usual non-transparent type.

The rearward or top anti-glare visor or panel is denoted at 8 and the optionally usable lower or front anti-glare shield or panel is denoted at 10. These are used singly and collectively and are of different densities. For example, the panel 8 may be ten percent and the panel 10 twenty-seven percent, or the like. There are two attaching devices used for mounting these anti-glare shields on the sun visor. Each attachment is characterized by a substantially U-shaped spring metal clip or clasp 12. The bight portion is at 14 and the gripping limbs are at 16 and they embrace opposite sides of the visor and serve as the anchor elements for the extensible and retractable linkage devices 18 and 20. These devices are each of the same construction, and a description of one will suffice for both. That is to say, there are flat end links 22 connected to the clip arms 16. There are similar flat links at 24 superimposed on and connected to the respective anti-glare shields. The intervening links are conveniently denoted by the numerals 26. All of the links have aligned hinging knuckles 28 which encase the complemental coil spring 30. This coil spring provides a "pintle" and the pintle has friction as well as spring-retentive properties. This makes it possible to stack, fold or otherwise angle the plate-like links into diversified arrangements. The proper number of links will be employed to provide the adaptable linkage devices. That is to say, these devices will be of any appropriate length to make it possible for the user to maintain the sun visor in its usual up or horizontal position and to then swing the anti-glare shields down, over, back and down, and in many different ways so that they may be used individually or collectively, all as is reasonably well obvious from the disclosure. This construction is diversified and has greater utility than the twin leaf hinges in the previous case, Ser. No. 506,518.

Changes in shape, size, rearrangement of parts and use of varying materials may be resorted to in actual practice without departing from the spirit of the invention or the scope of the adjoined claim.

What is claimed as new is as follows:

An attachment for a vehicle sun visor comprising an anti-glare shield and means whereby it may be mounted and suspended for operation on said sun visor, said means comprising at least one spring metal U-shaped clip which is adapted to be removably clasped on the usual free longitudinal edge portion of said visor, said clip having a bight portion to parallel said free edge and spaced parallel attaching and retaining limbs adapted to grip opposite sides of the visor at right angles to said edge, and a collapsible folding-type linkage device embodying a first flat link superimposed on and fixed to one of said limbs, a second flat link attached to an edge portion of said anti-glare shield in line with said first link, and a plurality of similar flat plate-like links, adjacent ends of all of said links having cooperating sets of companion connecting and hinging knuckles the turning axes of which are all the same and are parallel to the bight portion of said clip, and an assembling and hinging pintle arranged removably in the respective sets of hinging knuckles, each pintle comprising a friction-type coil spring.

References Cited in the file of this patent

UNITED STATES PATENTS

| | | |
|---|---|---|
| 1,554,161 | Hubbard | Sept. 15, 1925 |
| 2,101,901 | Fletcher | Dec. 14, 1937 |
| 2,112,726 | Kemp et al. | Mar. 29, 1938 |
| 2,204,691 | Olsen | June 18, 1940 |
| 2,212,007 | Buchanan | Aug. 20, 1940 |
| 2,492,074 | Thompson | Dec. 20, 1949 |

FOREIGN PATENTS

| | | |
|---|---|---|
| 497,223 | Great Britain | Dec. 12, 1938 |